No. 630,093. Patented Aug. 1, 1899.
I. NOAR.
BICYCLE.
(Application filed Mar. 24, 1899.)
(No Model.)

WITNESSES:
Edwin G. McKee
Geo. M. Anderson

INVENTOR
Isaac Noar
BY
E. W. Anderson
his ATTORNEY.

UNITED STATES PATENT OFFICE.

ISAAC NOAR, OF NEW YORK, N. Y.

BICYCLE.

SPECIFICATION forming part of Letters Patent No. 630,093, dated August 1, 1899.

Application filed March 24, 1899. Serial No. 710,367. (No model.)

*To all whom it may concern:*

Be it known that I, ISAAC NOAR, a citizen of the United States, and a resident of New York, in the county of New York and State of New York, have invented certain new and useful Improvements in Bicycles; and I do declare the following to be a full, clear, and exact description of the invention, such as will enable others skilled in the art to which it appertains to make and use the same, reference being had to the accompanying drawings, and to letters of reference marked thereon, which form a part of this specification.

Figure 1:
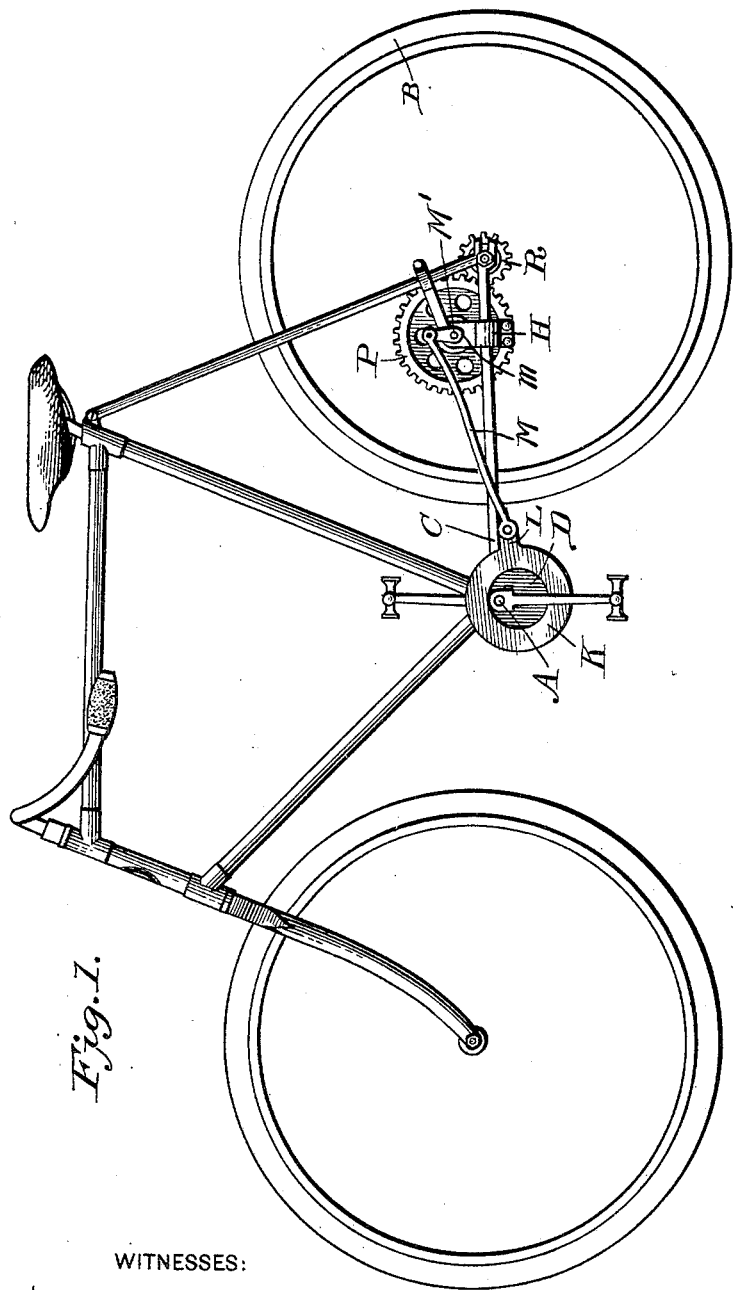
Figure 3:
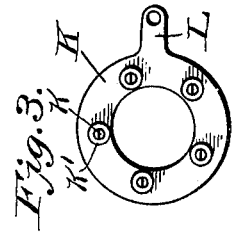
Figure 2:
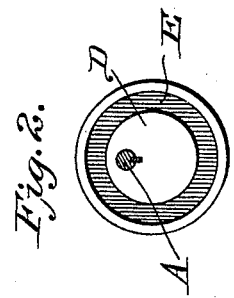

Figure 1 of the drawings is a representation of a side view of a bicycle, showing the invention as in application thereto. Fig. 2 is a detail view of the disk. Fig. 3 is a detail view of the annulus.

The object of this invention is to provide a bicycle-driving mechanism which is adapted to take the place of the sprocket chain and gear commonly employed and which shall be efficient, readily constructed, and capable of being applied to bicycles now in use without changing the frame or bearings thereof.

With this object in view the invention consists in the novel construction and combination of parts, all as hereinafter described, and pointed out in the appended claims.

Referring to the accompanying drawings, the letter A designates the pedal crank-shaft of a bicycle, B the rear driving-wheel thereof, and C the lower rear frame bars or forks.

D is a circular wheel or disk which is rigidly secured on one end portion of the crank-shaft and which has in its face a circular groove E, eccentric with respect to the crank-shaft axis, as shown.

K designates an annulus having upon its inner face a series of studs $k$, upon which are loosely mounted small antifriction-rollers $k'$, which are designed to engage and travel in the groove E of the disk D. Said annulus has a rearwardly-projecting arm L, which is connected by a pitman M with a crank $m$ of a short shaft or axle $M'$, which is journaled in bearings in a bracket H, clamped to the frame of the bicycle. This shaft or axle $M'$ is journaled forward of and slightly above the axle of the rear wheel and carries a large spur gear-wheel P, fixed thereto, whose teeth mesh with the teeth of a pinion R on the hub of the rear wheel.

The operation will be readily understood. Rotation of the crank-shaft actuates the pitman M to rotate the gear-wheel P, and thereby the pinion R and the rear wheel.

The above-described gearing can be readily applied to bicycles now in use without change in the frame or bearings thereof, the disk D taking the place of the crank sprocket-wheel and the pinion R the place of the small sprocket-wheel on the rear hub.

Having thus described my invention, what I claim as new, and desire to secure by Letters Patent, is—

1. In a bicycle, the combination of a crank-shaft, a wheel or disk rigidly secured to said shaft and having a circular groove in one of its faces which is eccentric with respect to the axis of the said shaft, an annulus having a series of antifriction-rollers which engage the said groove, a toothed wheel geared to the rear axle and secured upon an intermediate cranked shaft or axle, and a pitman which connects the said annulus with the crank of said axle, substantially as specified.

2. In a bicycle, a crank-shaft, a disk secured thereon and having an eccentric groove in one face thereof, an annulus having a series of rollers which engage the said groove, and driving connections between the said annulus and the hub of the rear wheel, substantially as specified.

In testimony whereof I affix my signature in presence of two witnesses.

ISAAC NOAR.

Witnesses:
JAMES A. RYAN,
GILBERT SNIDER.